US007215655B2

(12) United States Patent
Zhang et al.

(10) Patent No.: US 7,215,655 B2
(45) Date of Patent: May 8, 2007

(54) TRANSPORT FORMAT COMBINATION SELECTION IN A WIRELESS TRANSMIT/RECEIVE UNIT

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 209 days.

(21) Appl. No.: 11/019,489

(22) Filed: Dec. 22, 2004

(65) Prior Publication Data

US 2005/0169293 A1 Aug. 4, 2005

Related U.S. Application Data

(60) Provisional application No. 60/535,426, filed on Jan. 9, 2004.

(51) Int. Cl.
*H04B 7/216* (2006.01)
(52) U.S. Cl. .................................. 370/329; 370/341
(58) Field of Classification Search ................ None
See application file for complete search history.

(56) References Cited

U.S. PATENT DOCUMENTS

2005/0043052 A1* 2/2005 Whinnett et al. ......... 455/522
2005/0047393 A1* 3/2005 Liu .......................... 370/352
2005/0053088 A1* 3/2005 Cheng et al. .............. 370/464
2005/0068990 A1* 3/2005 Liu .......................... 370/516
2005/0152310 A1* 7/2005 Rudolf et al. .............. 370/329
2006/0085729 A1* 4/2006 Hashimoto ................ 714/794

OTHER PUBLICATIONS

3GPP2 C.S0002-C "Physical Layer Standard for cdma2000 Spread Spectrum Systems", 3rd Generation Partnership Project 2 "3GPP2", Version 2.0, Revision C, Jul. 23, 2004.
3GPP2 C.20003-C, "Medium Access Control (MAC) Standard for cdma2000 Spread Spectrum Systems", 3rd Generation Partnership Project 2 "3GPP2", Version 2.0, Release C, Aug. 2004.
3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.

(Continued)

*Primary Examiner*—Doris H. To
*Assistant Examiner*—Soon D. Hyun
(74) *Attorney, Agent, or Firm*—Volpe and Koenig, P.C.

(57) ABSTRACT

A method for selecting a transport format combination (TFC) in a wireless transmit/receive unit (WTRU) is disclosed. The WTRU is configured to process more than one coded composite transport channel (CCTrCH) for uplink transmission. The WTRU estimates a transmit power for each of a plurality of available TFCs and selects a TFC for each CCTrCH such that the sum of the estimated WTRU transmit power for selected TFCs is within a maximum WTRU transmit power.

39 Claims, 3 Drawing Sheets

OTHER PUBLICATIONS

3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.

3GPP TS25.308, 3rd Generation Partnership Project; Technical Specification Group Radio Access Network; "High Speed Downlink Packet Access (HSDPA)", Version 5.4.0, Stage 2, Release 5, Mar. 2003.

3GPP TS25.309, 3rd Generation Partnership Project; Technical Specification Group Radio Access Network; "FDD Enhanced Uplink", Version 6.0.0, Stage 2, Release 6, Sep. 2004.

3GPP TS25.308, 3rd Generation Partnership Project; Technical Specification Group Radio Access Network; "High Speed Downlink Packet Access (HSDPA)", Version 5.5.0, Stage 2, Release 5, Mar. 2004.

3GPP TS25.309, 3rd Generation Partnership Project; Technical Specification Group Radio Access Network; "FDD Enhanced Uplink"; Version 0.2.0, Stage 2, Release 6, Jun. 2004.

3GPP TSG-RAN WG2, Meeting #38, "E-DCH L2/L3 issues", Oct. $6^{TH}$-$10^{TH}$, 2003, Sophia Antipolis, France, pp. 1-2.

3GPP TSG-RAN WG2, Meeting #40, "E-DCH L2/L3 protocol issues", Jan. $12^{th}$-$16^{th}$, 2004, Sophia Antipolis, France, pp. 1-2.

* cited by examiner

TRANSPORT FORMAT COMBINATION SELECTION IN A WIRELESS TRANSMIT/RECEIVE UNIT

CROSS REFERENCE TO RELATED APPLICATION

This application claims the benefit of U.S. Provisional Application No. 60/535,426 filed Jan. 9, 2004 which is incorporated by reference as if fully set forth.

FIELD OF INVENTION

The present invention is related to a wireless communication system. More particularly, the present invention is related to transport format combination (TFC) selection in wireless transmit/receive units (WTRUs).

BACKGROUND

Under the current Third Generation Partnership Project (3GPP) standards, a WTRU is required to estimate a transmission power for each TFC. In the case that a certain TFC would require more transmission power than the maximum allowed WTRU transmission power, the WTRU should limit the usage of that TFC.

The WTRU continuously evaluates which TFCs can be used for transmission. The evaluation is performed using the estimated WTRU transmit power of a given TFC. When any TFC is restricted for exceeding a transmit power limit, the medium access control (MAC) entity in the WTRU notifies an upper layer to reduce the data rate, if applicable.

Under the current 3GPP standards, a WTRU has only one coded composite transport channel (CCTrCH) in uplink transmission. Therefore, the WTRU transmit power is the transmit power of the CCTrCH, which is determined by the TFC used for the CCTrCH.

In order to improve uplink coverage, throughput and transmission latency for uplink transmissions, enhanced uplink (EU) is currently being investigated in 3GPP. With EU implementation, a WTRU may have more than one CCTrCH in uplink transmissions; one for the regular dedicated channel (DCH) and the other for EU enhanced dedicated channel (E-DCH). In this case, the WTRU transmit power will be the sum of the transmit power of two CCTrCHs.

The WTRU transmit power is determined jointly by the TFCs of the two CCTrCHs. The combination of the TFC used by the dedicated CCTrCH and the TFC used by the EU CCTrCH is defined as the TFC pair of the WTRU whose transmit power is determined jointly by the TFCs of the two CCTrCHs. This is not an optimal method of determining the TFCs for more than one CCTrCH.

There is a need for an efficient method for selecting a combination of TFCs for more than one CCTrCHs in uplink transmission.

SUMMARY

The present invention is related to a method and apparatus for selecting a TFC in a WTRU. The WTRU is configured to process more than one CCTrCH for uplink transmission. The WTRU estimates a transmit power for each of a plurality of available TFCs and selects a TFC for each CCTrCH such that the sum of the estimated WTRU transmit power for the selected TFCs is within the allowed maximum WTRU transmit power.

The WTRU may give priority to a particular CCTrCH, whereby the TFC for that particular CCTrCH is selected first and the TFC for the other CCTrCH is selected within the estimated remaining WTRU transmit power after power required for the selected TFC on the prioritized CCTrCH is deducted from the maximum allowed WTRU transmit power. This method allows for transmission of channels mapped to the first CCTrCH to be prioritized over channels mapped to the other CCTrCH.

Alternatively, the WTRU may reserve a minimum set of TFCs for the other CCTrCH, whereby a TFC for the prioritized CCTrCH is first selected within the maximum allowed WTRU transmit power less the power required to support a minimum set of TFCs on the other CCTrCH. Then the TFC for the other CCTrCH is selected within the remaining WTRU transmit power after power required for the selected TFC on the prioritized CCTrCH is deducted from the maximum allowed WTRU transmit power. This method allows for transmission of channels mapped to the first CCTrCH to be prioritized over channels mapped to the other CCTrCHs while reserving transmit power to allow for a minimum set of TFCs on the other CCTrCH to be transmitted without being effected by the maximum allowed WTRU transmit power limit.

Alternatively, the WTRU may be configured for individual maximum transmit power for each of the plurality of CCTrCHs, whereby a TFC for each CCTrCH is selected within the individual maximum transmit power designated to each CCTrCH. This method allows each CCTrCH to be given a quality of service (QoS) relative to the other CCTrCH. Activity on one CCTrCH does not take priority or reduce the rate of the other CCTrCH.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Hereinafter, the present invention will be described with reference to a system supporting two CCTrCHs, (i.e., a dedicated CCTrCH and an EU CCTrCH). However, it should be noted that the present invention is applicable to a system supporting more than two CCTrCHs.

Figure 1:
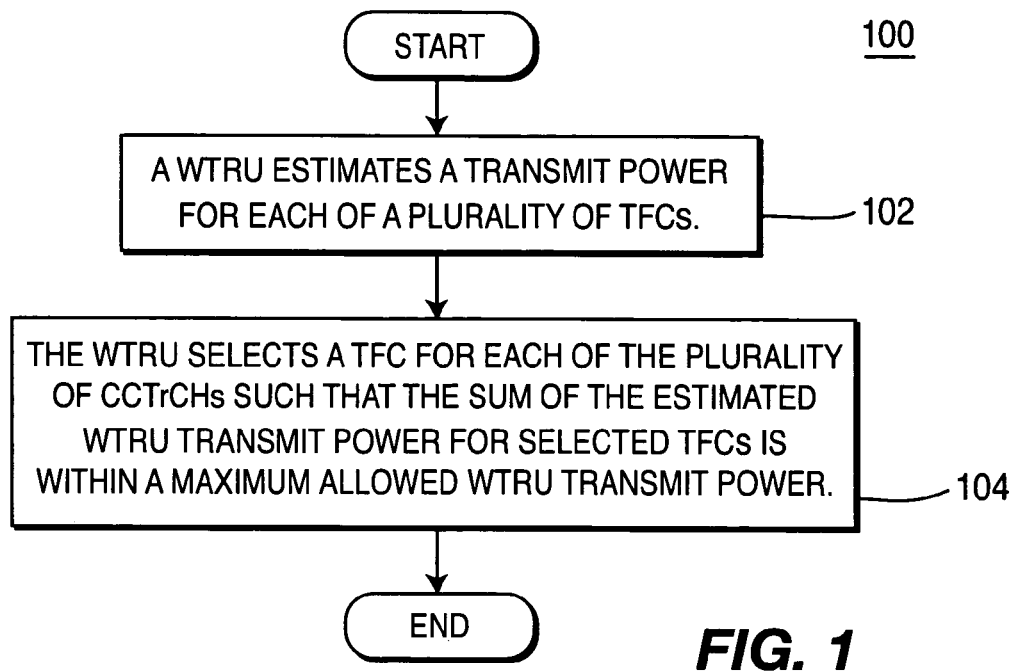
FIG. 1 is a flow diagram of a general process for selecting TFCs in accordance with a first embodiment of the present invention.

FIG. 1 is a flow diagram of a process 100 for selecting TFCs in accordance with a first embodiment of the present invention. The WTRU is configured to process a dedicated CCTrCH and an EU CCTrCH simultaneously in uplink transmission. The transmit power of the WTRU is limited to a maximum allowed WTRU transmit power, which is set by the wireless communication system. In each transmit time interval (TTI), the WTRU estimates the transmit power for each of a plurality of available TFCs (step 102) for each CCTrCH. The WTRU estimates the transmit power of each TFC over a predetermined period taking into account the gain factor of each corresponding TFC. The WTRU then selects TFCs for transmission on each CCTrCH among a plurality of available TFCs, such that the sum of the estimated transmit power of the selected TFCs for the dedicated CCTrCH and the EU CCTrCH does not exceed the maximum allowed WTRU transmit power (step 104).

Additionally, the dedicated CCTrCH, the EU CCTrCH, or both may be provided with a capability of transmitting a reserved minimum set of TFCs even when the power required for transmission of these TFCs exceeds the maximum allowed WTRU transmit power. TFCs that require power greater then the maximum allowed transmit power are defined to be in an excess power state. The minimum set is for reserving a lowest rate in a CCTrCH, thereby maintaining the basic services for the channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR).

The reserved minimum set of TFCs may be transmitted in an excess power state. In order to maintain the transmit power within the allowed maximum level, a WTRU scales down power on physical channels mapped to the dedicated CCTrCH, the EU CCTrCH, or all physical channels present.

Regardless of the TFC selection, the EU CCTrCH may be provided with a minimum reserved set of TFCs that is one or more transport blocks per logical channel or MAC-d flow mapped to the EU CCTrCH. A transport block is one or more radio link control (RLC) protocol data units (PDUs). One or more transport blocks is equivalent to a data rate. The reserved set of TFCs can be transmitted in an excess power state by scaling down power on either the physical channels mapped to the EU CCTrCH, the dedicated CCTrCH or all present UL channels.

Figure 2:
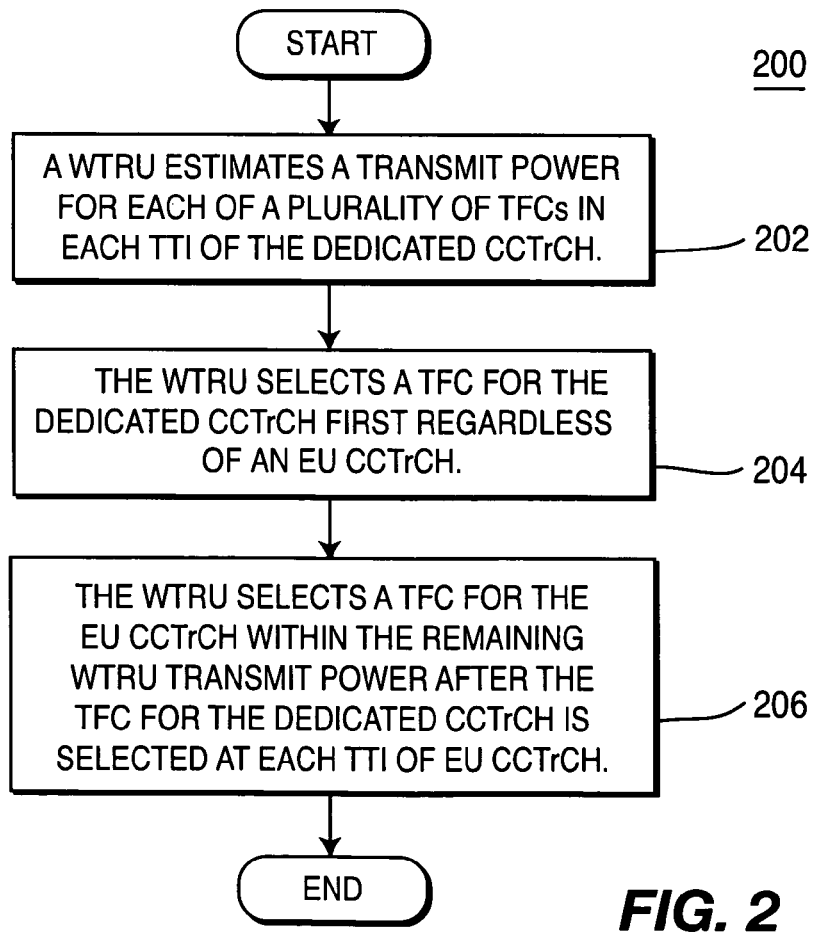
FIG. 2 is a flow diagram of a process for selecting TFCs in accordance with a second embodiment of the present invention.

FIG. 2 is a flow diagram of a process 200 for selecting TFCs in accordance with a second embodiment of the present invention. TFC selection of the dedicated CCTrCH is prioritized over TFC selection of the EU CCTrCH. In each TTI of the dedicated CCTrCH, the WTRU estimates the transmit power requirement for each of a plurality of available TFCs configured for the dedicated CCTrCH (step 202). The WTRU selects a TFC for the dedicated CCTrCH first, without considering the power requirement of the EU CCTrCH (step 204). After the TFC for the dedicated CCTrCH is selected, at each TTI of the EU CCTrCH the WTRU selects a TFC for the EU CCTrCH within the remaining WTRU transmit power after the power required for the selected TFC for the dedicated CCTrCH is deducted from the maximum allowed WTRU transmit power (step 206). The TFC selection of the dedicated CCTrCH is not affected by the operation of EU CCTrCH, while the TFC selection of the EU CCTrCH is affected and limited by the operation of the dedicated CCTrCH.

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

In process 200, the EU CCTrCH may allow transmission of a minimum set of TFCs even when these TFCs are in excess power state. An EU TFC is in excess power state when the estimated remaining power is less then the calculated transmission power requirement for the EU CCTrCH TFC. The EU minimum set reserves a lowest or guaranteed rate on channels mapped to the EU CCTrCH, and thereby maintains the basic services for EU channels. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR). When transmitting a TFC in excess power state, in order to maintain the transmit power within the allowed maximum level, the WTRU scales down power on physical channels mapped to the EU CCTrCH, the dedicated CCTrCH, or all physical channels present.

Figure 3:
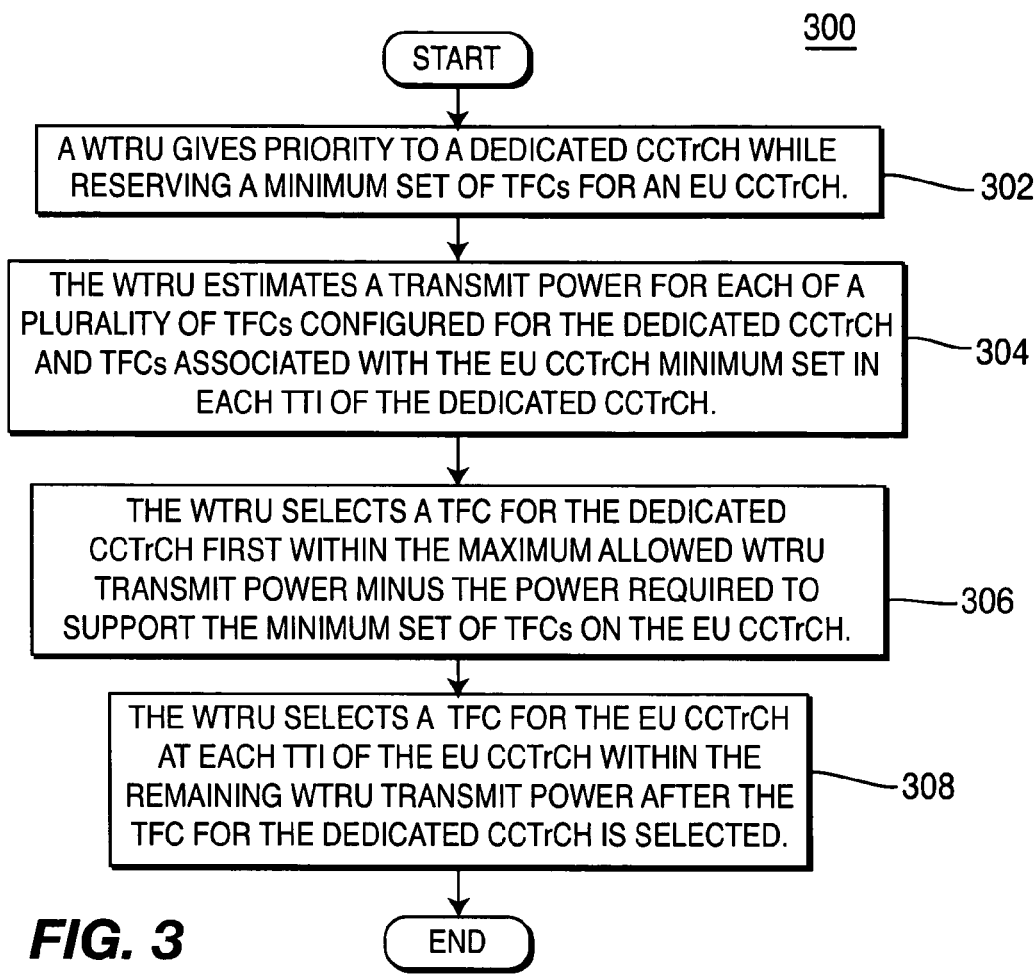
FIG. 3 is a flow diagram of a process for selecting TFCs in accordance with a third embodiment of the present invention.

FIG. 3 is a flow diagram of a process 300 for selecting TFCs in accordance with a fourth embodiment of the present invention. The WTRU gives priority to dedicated CCTrCH TFC selection while reserving transmit power for a minimum set of EU CCTrCH TFCs (step 302). A minimum set of TFCs for an EU CCTrCH is defined to reserve a lowest or guaranteed rate for channels mapped to the EU CCTrCH. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH, or a number of transport blocks per TTI corresponding to a GBR.

The EU CCTrCH may allow transmission of a minimum set of TFCs even when these TFCs are in excess power state. An EU TFC is in excess power state when the estimated remaining power is less then the calculated transmission power requirement for the EU TFC. When transmitting a TFC in excess power state, in order to maintain the transmit power within the allowed maximum level, the WTRU scales down power on physical channels mapped to the EU CCTrCH, the dedicated CCTrCH, or all physical channels present.

When a TFC is in an excess power state (with reduced power), the quality of the transmission is reduced, (i.e., lower SIR, higher BLER, etc). This may defeat the purpose of maintaining the minimum set. Therefore, in order to minimize the possibility that the EU CCTrCH TFC has to be transmitted in an excess power state, and to further insure the minimum set is really supported, in process 300 transmit power is reserved for the EU minimum set when TFC selection is performed on the prioritized dedicated CCTrCH.

TFC selection of the dedicated CCTrCH is prioritized over TFC selection of the EU CCTrCH. In each TTI of the dedicated CCTrCH, the WTRU estimates the transmit power for each of a plurality of available TFCs configured for the dedicated CCTrCH and TFCs associated with the EU CCTrCH minimum set (step 304). The WTRU selects a TFC for the dedicated CCTrCH that has a power requirement that does not exceed the maximum allowed transmit power minus the power required to support the minimum set of TFCs on the EU CCTrCH (step 306). After the TFC for the dedicated CCTrCH is selected, at each TTI of the EU CCTrCH the WTRU selects a TFC for the EU CCTrCH with the remaining transmit power after power required for the selected the TFC for the dedicated CCTrCH is deducted from the maximum allowed transmit power (step 308).

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

Since the dedicated CCTrCH TFC selection takes precedence over the EU CCTrCH, and the power requirement may change during the dedicated TTI, the minimum set of TFCs of the EU CCTrCH may still be transmitted in an excess power state even though power was reserved when the dedicated TFC was selected. In this situation, in order to maintain the transmit power within the allowed maximum level, the WTRU scales down all physical channels mapped to the EU CCTrCH, the dedicated CCTrCH, or all physical channels present.

Figure 4:
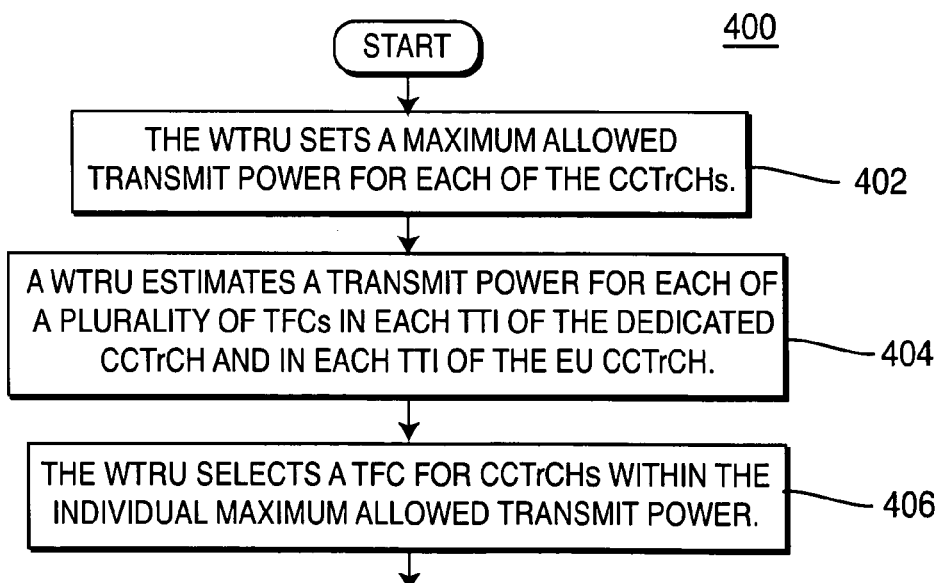
FIG. 4 is a flow diagram of a process for selecting TFCs in accordance with a fourth embodiment of the present invention.

FIG. 4 is a flow diagram of a process 400 for selecting TFCs in accordance with a third embodiment of the present invention. The WTRU sets an individual maximum transmit power, or a ratio relative to the maximum allowed WTRU transmit power, for a dedicated CCTrCH and an EU CCTrCH (step 402). The maximum power level (or the ratio) for each CCTrCH is a configurable parameter. The factors for determining the maximum power level (or the ratio) for each CCTrCH may include, but are not limited to, a data rate of each CCTrCH, quality-of-service (QoS) of each CCTrCH and a relative priority between the CCTrCHs.

In each TTI of the dedicated CCTrCH and in each TTI of the EU CCTrCH, the WTRU estimates the transmit power for each of a plurality of available TFCs (step 404). The WTRU then selects a TFC for each CCTrCH within the individual maximum transmit power of each CCTrCH (step 406). The TFC selection process for each CCTrCH operates independently. The TFC of each CCTrCH is selected from only those TFCs that can be supported by the individual maximum power level determined for a particular CCTrCH.

The dedicated CCTrCH, the EU CCTrCH, or both may be provided with a capability of transmitting a minimum set of TFCs. The minimum set is for reserving a lowest rate for each channel mapped to the CCTrCH, thereby maintaining the basic services for each channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a GBR.

The minimum set of TFCs may be transmitted in an excess power state. In this situation, in order to maintain the transmit power within the allowed maximum level, the WTRU scales down all physical channels mapped to the EU CCTrCH, the dedicated CCTrCH, or all physical channels present.

Figure 5:
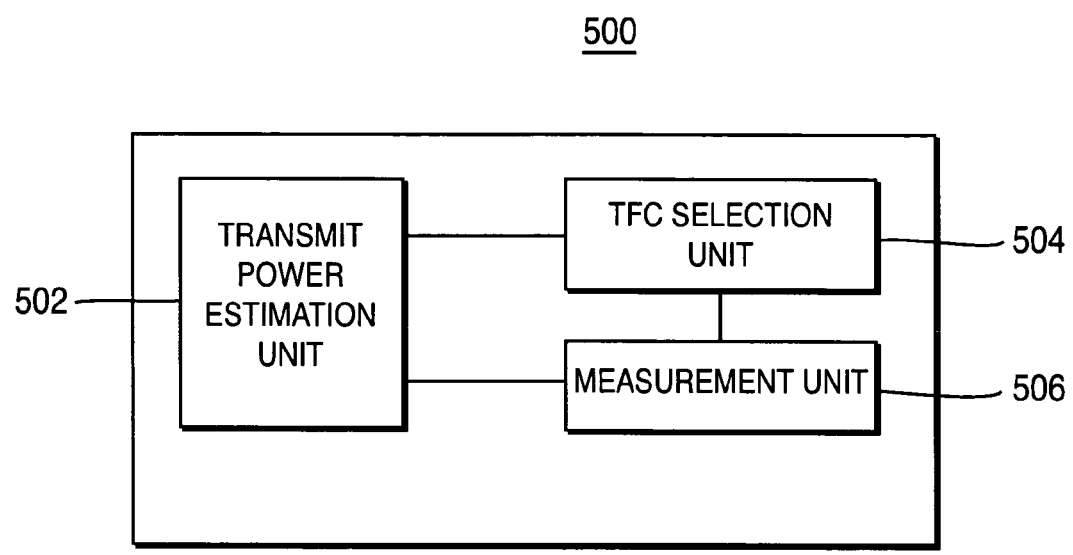
FIG. 5 is a block diagram of an apparatus for selecting TFCs in accordance with the present invention.

FIG. 5 is a block diagram of an apparatus 500 for selecting TFCs in accordance with the present invention. The apparatus comprises a transmit power estimation unit 502, a TFC selection unit 504, and a measurement unit 506. The transmit power estimation unit 502 calculates an estimate of a transmit power for each of a plurality of available TFCs. The TFC selection unit 504 selects a TFC for each CCTrCH such that the sum of the estimated WTRU transmit power for the selected TFCs is within a maximum WTRU transmit power. The measurement unit 506 performs physical measurements of the WTRU transmit power over a predetermined period, and the transmit power estimation unit 502 calculates the estimate of a transmit power of each TFC using the measurement results and a gain factor of the corresponding TFC.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a frequency division duplex wideband code division multiple access communication system for selecting a dedicated transport format combination (TFC) for use in transmitting a dedicated coded composite transport channel (CCTrCH) and an enhanced uplink (EU) TFC for use in transmitting an EU CCTrCH, the method comprising:
   a wireless transmit/receive unit (WTRU):
      determining available dedicated TFCs of the dedicated CCTrCH by eliminating at least dedicated TFCs that are in an excess power state based on a maximum allowed WTRU transmit power;
      selecting a dedicated TFC for the dedicated CCTrCH based on the available TFCs;
      determining available EU TFCs for the EU CCTrCH by at least eliminating EU TFCs that are in excess power state based on a WTRU remaining transmit power after the dedicated TFC selection; and
      selecting a TFC for the EU CCTrCH from at least the available TFCs.

2. The method of claim 1 further comprising reserving at least one EU TFC for the EU CCTrCH and wherein the selecting an EU TFC for the EU CCTrCH is from the available EU TFCs or the reserved at least one EU TFC.

3. The method of claim 2 wherein the reserving at least one EU TFC is reserving a minimum set of at least one EU TFC and if the maximum WTRU transmit power is exceeded as a result of selection of the EU TFC from the minimum set, the WTRU scales down a transmit power for all physical channels present.

4. The method of claim 3 wherein the minimum set includes EU TFCs which are permitted to be transmitted in an excess power state.

5. The method of claim 2 wherein the reserved EU TFCs include EU TFCs that guarantee a data rate.

6. The method of claim 1 wherein the WTRU maximum allowed transmit power is set by a wireless communication system.

7. The method of claim 1 wherein the WTRU maximum allowed transmit power is a maximum transmit power of the WTRU.

8. The method of claim 2 wherein the reserved EU TFCs are derived so that the reserved EU TFCs reserve a lowest rate in the EU CCTrCH that maintains basic services.

9. The method of claim 5 wherein the reserved EU TFCs are derived so that the reserved EU TFCs reserve a lowest rate per logical channel.

10. The method of claim 5 wherein the reserved EU TFCs are derived so that the reserved EU TFCs reserve a lowest rate per MAC-d flow.

11. The method of claim 2 wherein the reserved EU TFCs are derived so that the reserved EU TFCs allow transmission of one transport block per channel.

12. The method of claim 2 wherein the reserved EU TFCs are derived so that the reserved EU TFCs allow for a number of transport blocks per a transmit time interval to correspond to a guaranteed rate.

13. The method of claim 2 wherein the reserved EU TFCs are derived so that the reserved EU TFCs allow for a lowest guaranteed rate on channels mapped to the EU CCTrCH.

14. A frequency division duplex wideband code division multiple access wireless transmit/receive unit (WTRU) for selecting dedicated transport format combinations (TFCs) for use in transmitting a dedicated coded composite transport channel (CCTrCH) and enhanced uplink (EU) TFCs for use in transmitting an EU CCTrCH, the WTRU comprising:

a TFC selection unit to determine available dedicated TFCs of the dedicated CCTrCH by eliminating at least dedicated TFCs that are in an excess power state based on a maximum allowed WTRU transmit power;

the TFC selection device to select a dedicated TFC for the dedicated CCTrCH based on the available TFCs;

the TFC selection device to determine available EU TFCs for the EU CCTrCH by at least eliminating EU TFCs that are in excess power state based on a WTRU remaining transmit power after the dedicated TFC selection;

the TFC selection device to select a TFC for the EU CCTrCH from at least the available TFCs.

15. The WTRU of claim 14 wherein the TFC selection device is to reserve at least one EU TFC for the EU CCTrCH and wherein the selecting an EU TFC for the EU CCTrCH is from the available EU TFCs or the reserved at least one EU TFC.

16. The WTRU of claim 15 wherein the reserving at least one EU TFC is reserving a minimum set of at least one EU TFC and if the maximum WTRU transmit power is exceeded as a result of selection of the EU TFC from the minimum set, the WTRU scales down a transmit power for all physical channels present.

17. The WTRU of claim 16 wherein the minimum set includes EU TFCs which are permitted to be transmitted in an excess power state.

18. The WTRU of claim 15 wherein the reserved EU TFCs include EU TFCs that guarantee a data rate.

19. The WTRU of claim 14 wherein the WTRU maximum allowed transmit power is set by a wireless communication system.

20. The WTRU of claim 14 wherein the WTRU maximum allowed transmit power is a maximum transmit power of the WTRU.

21. The WTRU of claim 15 wherein the reserved EU TFCs are derived so that the reserved EU TFCs reserve a lowest rate in the EU CCTrCH that maintains basic services.

22. The WTRU of claim 18 wherein the reserved EU TFCs are derived so that the reserved EU TFCs reserve a lowest rate per logical channel.

23. The WTRU of claim 18 wherein the reserved EU TFCs are derived so that the reserved EU TFCs reserve a lowest rate per MAC-d flow.

24. The WTRU of claim 15 wherein the reserved EU TFCs are derived so that the reserved EU TFCs allow transmission of one transport block per channel.

25. The WTRU of claim 15 wherein the reserved EU TFCs are derived so that the reserved EU TFCs allow for a number of transport blocks per a transmit time interval to correspond to a guaranteed rate.

26. The WTRU of claim 15 wherein the reserved EU TFCs are derived so than the reserved EU TFCs allow for a lowest guaranteed rate on channels mapped to the EU CCTrCH.

27. A frequency division duplex wideband code division multiple access base station for use in receiving a dedicated coded composite transport channel (CCTrCH) and receiving an enhanced uplink (EU) CCTrCH:

the base station to determine a dedicated transport format (TFC) for the dedicated CCTrCH, the dedicated TFC is selected for the dedicated CCTrCH by determining available dedicated TFCs of the dedicated CCTrCH by eliminating at least dedicated TFCs that are in an excess power state based on a maximum allowed WTRU transmit power; and the base station to determine an EU TFC of an EU CCTrCH, the EU TFC is selected by determining available EU TFCs for the EU CCTrCH by at least eliminating EU TFCs that are in excess power state based on a WTRU remaining transmit power after the dedicated TFC selection.

28. The base station of claim 27 wherein at least one EU TFC is reserved for the EU CCTrCH and wherein the selecting a TFC for the EU CCTrCH is from the available TFCs or the reserved at least one EU TFC.

29. The base station of claim 28 wherein the reserving at least one EU TFC is reserving a minimum set of at least one EU TFC and if the maximum WTRU transmit power is exceeded as a result of selection of the EU TFC from the minimum set, a transmit power for all physical channels present is scaled down.

30. The base station of claim 29 wherein the minimum set includes EU TFCs which are permitted to be transmitted in an excess power state.

31. The base station of claim 28 wherein the reserved EU TFCs include EU TFCs that guarantee a data rate.

32. The base station of claim 28 wherein the WTRU maximum allowed transmit power is set by a wireless communication system.

33. The base station of claim 28 wherein the WTRU maximum allowed transmit power is a maximum transmit power of the WTRU.

34. The base station of claim 28 wherein the reserved EU TFCs are derived so that the reserved EU TFCs reserve a lowest rate in the EU CCTrCH that maintains basic services.

35. The base station of claim 31 wherein the reserved EU TFCs are derived so that the reserved EU TFCs reserve a lowest rate per logical channel.

36. The base station of claim 31 wherein the reserved EU TFCs are derived so that the reserved EU TFCs reserve a lowest rate per MAC-d flow.

37. The base station of claim 28 wherein the reserved TFCs are derived so that the reserved TFCs allow transmission of one transport block per channel.

38. The base station of claim 28 wherein the reserved TFCs are derived so that the reserved TFCs allow for a number of transport blocks per a transmit time interval to correspond to a guaranteed rate.

39. The base station of claim 28 wherein the reserved TFCs are derived so than the reserved TFCs allow for a lowest guaranteed rate on channels mapped to the EU CCTrCH.

* * * * *

UNITED STATES PATENT AND TRADEMARK OFFICE
CERTIFICATE OF CORRECTION

PATENT NO. : 7,215,655 B2
APPLICATION NO. : 11/019489
DATED : May 8, 2007
INVENTOR(S) : Zhang et al.

It is certified that error appears in the above-identified patent and that said Letters Patent is hereby corrected as shown below:

IN THE SPECIFICATION

At column 4, line 4, after the words "is less", delete "then" and insert therefor --than--.

At column 4, line 34, after the words "is less", delete "then" and insert therefor --than--.

At column 4, line 62, after the word "selected", delete "the".

IN THE CLAIMS

At claim 1, column 6, line 11, after the word "transmitting", delete "an EU CCTrCH" and insert therefor --UE data over an enhanced dedicated channel (E-DCH)--.

At claim 1, column 6, line 20, after the words "for the EU", delete "CCTrCH" and insert therefor --data--.

At claim 1, column 6, line 24, after the words "for the EU", delete "CCTrCH" and insert therefor --data--.

At claim 2, column 6, line 27, after the words "for the EU", delete "CCTrCH" and insert therefor --data--.

At claim 2, column 6, line 28, after the words "for the EU", delete "CCTrCH" and insert therefor --data--.

At claim 8, column 6, line 49, after the words "in the EU", delete "CCTrCH" and insert therefor --data--.

At claim 14, column 7, line 4, after the word "transmitting", delete "an EU CCTrCH" and insert therefor --UE data over an enhanced dedicated channel (E-DCH)--.

At claim 14, column 7, line 12, after the words "for the EU", delete "CCTrCH" and insert therefor --data--.

UNITED STATES PATENT AND TRADEMARK OFFICE
CERTIFICATE OF CORRECTION

| | |
|---|---|
| PATENT NO. | : 7,215,655 B2 |
| APPLICATION NO. | : 11/019489 |
| DATED | : May 8, 2007 |
| INVENTOR(S) | : Zhang et al. |

It is certified that error appears in the above-identified patent and that said Letters Patent is hereby corrected as shown below:

At claim 14, column 7, line 17, before the words "from at least", delete "CCTrCH" and insert therefor --data--.

At claim 15, column 7, line 19, after the words "for the EU", delete "CCTrCH" and insert therefor --data--.

At claim 15, column 7, line 20, after the words "for the EU", delete "CCTrCH" and insert therefor --data--.

At claim 21, column 7, line 42, after the words "in the EU", delete "CCTrCH" and insert therefor --TrCH--.

At claim 26, column 7, line 59, delete "CCTrCH" and insert therefor --data--.

At claim 27, column 8, line 2, after the words "uplink (EU)", delete "CCTrCH" and insert therefor --data over an enhanced dedicated channel (E-DCH)--.

At claim 27, column 8, line 11, before the words "the EU", delete "CCTrCH" and insert therefor --data--.

At claim 27, column 8, line 12, after the words "for the EU", delete "CCTrCH" and insert therefor --data--.

At claim 28, column 8, line 17, after the words "for the EU", delete "CCTrCH" and insert therefor --data--.

At claim 28, column 8, line 18, after the words "for the EU", delete "CCTrCH" and insert therefor --data--.

At claim 34, column 8, line 41, after the words "in the EU", delete "CCTrCH" and insert therefor --data--.

UNITED STATES PATENT AND TRADEMARK OFFICE
CERTIFICATE OF CORRECTION

| | |
|---|---|
| PATENT NO. | : 7,215,655 B2 |
| APPLICATION NO. | : 11/019489 |
| DATED | : May 8, 2007 |
| INVENTOR(S) | : Zhang et al. |

It is certified that error appears in the above-identified patent and that said Letters Patent is hereby corrected as shown below:

At column 39, column 8, line 58, delete "CCTrCH" and insert therefor --data--.

Signed and Sealed this

Twenty-second Day of July, 2008

JON W. DUDAS
*Director of the United States Patent and Trademark Office*